US007444744B2

(12) United States Patent
Caveney et al.

(10) Patent No.: US 7,444,744 B2
(45) Date of Patent: Nov. 4, 2008

(54) TOOL FOR CONNECTORS ASSEMBLY

(75) Inventors: Jack E. Caveney, Hinsdale, IL (US); Roger D Segroves, Lockport, IL (US); Lawrence A. Hillegonds, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 142 days.

(21) Appl. No.: 11/403,273

(22) Filed: Apr. 13, 2006

(65) Prior Publication Data

US 2006/0230608 A1 Oct. 19, 2006

Related U.S. Application Data

(60) Provisional application No. 60/756,014, filed on Jan. 4, 2006, provisional application No. 60/671,143, filed on Apr. 14, 2005.

(51) Int. Cl.
*B23P 19/00* (2006.01)

(52) U.S. Cl. .............................. 29/751; 29/747; 29/748; 29/753; 29/758

(58) Field of Classification Search ................... 29/745, 29/747, 748, 750, 751, 758, 761, 270, 280, 29/282, 33 M, 854, 857, 861, 862, 863, 865, 29/866, 867; 72/409.14, 461, 751; 173/120; 81/302, 421; 7/107
See application file for complete search history.

(56) References Cited

U.S. PATENT DOCUMENTS 2,829,545 A * 4/1958 Eckold ...................... 72/466.8
3,571,890 A 3/1971 Brehm
3,584,525 A * 6/1971 Caveney et al. ............... 81/488
3,742,571 A 7/1973 Brehm
3,810,228 A 5/1974 Caveney et al.
3,866,294 A 2/1975 McCaughey
3,866,297 A 2/1975 Aldridge et al.
3,898,724 A 8/1975 Conorich
3,946,476 A 3/1976 Mason
4,040,179 A 8/1977 Sanchez
4,047,294 A 9/1977 Quigley
4,085,497 A 4/1978 Nijman et al.

(Continued)

FOREIGN PATENT DOCUMENTS

EP 0375489 B1 6/1990

(Continued)

*Primary Examiner*—Minh Trinh
(74) *Attorney, Agent, or Firm*—Robert A. McCann; Christopher S. Clancy; Aimee E. McVady

(57) ABSTRACT

A multi-use tool for assembly of electrical connectors includes a main tool body having an electrical connector assembly holder. The holder includes first and second cavities. The first cavity includes spaced anvils and removably retains an electrical connector end cap between the anvils. A cutting ram is opposed to the first cavity and includes two cutting blades that are translatable between disengaged and engaged positions to trim and sever excess wire lengths from the electrical connector end cap. The second cavity removably retains the electrical connector end cap and a jack housing. A termination ram is opposed to the second cavity and movably mounted between disengaged and engaged positions to terminate the jack housing with the end cap. A trigger mechanism is operably connected to both the cutting ram and the termination ram.

22 Claims, 12 Drawing Sheets

U.S. PATENT DOCUMENTS

| | | | | | |
|---|---|---|---|---|---|
| 4,109,370 | A | | 8/1978 | Quigley | |
| 4,180,904 | A | | 1/1980 | Nijman | |
| 4,184,244 | A | | 1/1980 | Kaczmarek | |
| 4,241,496 | A | | 12/1980 | Gregson | |
| 4,242,792 | A | | 1/1981 | Kirsinas, Jr. | |
| 4,247,983 | A | | 2/1981 | Jansson et al. | |
| 4,275,495 | A | | 6/1981 | Boutcher, Jr. et al. | |
| 4,306,349 | A | | 12/1981 | Knickerbocker | |
| 4,318,215 | A | | 3/1982 | Holt | |
| 4,334,353 | A | | 6/1982 | Holt | |
| 4,389,769 | A | | 6/1983 | Casey | |
| 4,408,391 | A | | 10/1983 | Pohl | |
| 4,453,307 | A | | 6/1984 | Casey | |
| 4,467,516 | A | | 8/1984 | John et al. | |
| 4,480,374 | A | | 11/1984 | Meyer | |
| 4,625,386 | A | | 12/1986 | Bieganski | |
| 4,627,150 | A | * | 12/1986 | Burnett | 29/566.4 |
| 4,627,164 | A | | 12/1986 | Mikic et al. | |
| 4,635,355 | A | * | 1/1987 | Brinkman et al. | 29/747 |
| 4,642,874 | A | | 2/1987 | Litehizer, Jr. | |
| 4,656,725 | A | | 4/1987 | Knickerbocker | |
| 4,660,241 | A | * | 4/1987 | Chen et al. | 7/107 |
| 4,696,090 | A | | 9/1987 | Gregson et al. | |
| 4,790,068 | A | | 12/1988 | Sato | |
| 4,838,129 | A | | 6/1989 | Cope | |
| 4,972,575 | A | | 11/1990 | Frantz et al. | |
| 5,074,032 | A | | 12/1991 | Anderson | |
| 5,109,591 | A | | 5/1992 | Hung | |
| 5,152,051 | A | | 10/1992 | Folk et al. | |
| 5,165,167 | A | | 11/1992 | Dechelette | |
| 5,195,230 | A | | 3/1993 | Krietzman | |
| 5,214,842 | A | | 6/1993 | Chen | |
| 5,277,051 | A | | 1/1994 | Liu | |
| 5,402,561 | A | | 4/1995 | Cerquone et al. | |
| 5,412,862 | A | | 5/1995 | Comerci et al. | |
| 5,428,983 | A | | 7/1995 | Lin | |
| 5,457,876 | A | | 10/1995 | Gerhard, Jr. | |
| 5,546,653 | A | | 8/1996 | Tournier et al. | |
| 5,624,274 | A | | 4/1997 | Liu | |
| 5,628,105 | A | | 5/1997 | Fallandy et al. | |
| 5,649,357 | A | | 7/1997 | Chapman et al. | |
| 5,659,948 | A | | 8/1997 | Vanderhoof et al. | |
| 5,813,109 | A | | 9/1998 | Ziegler et al. | |
| 5,832,603 | A | | 11/1998 | Fallandy | |
| 5,836,069 | A | | 11/1998 | Fallandy et al. | |
| 5,893,185 | A | | 4/1999 | Okrepkie et al. | |
| 5,983,489 | A | * | 11/1999 | Jee | 29/751 |
| 6,036,535 | A | * | 3/2000 | Whiteman et al. | 439/519 |
| 6,112,404 | A | * | 9/2000 | Tarpill | 29/751 |
| 6,161,278 | A | | 12/2000 | Easter et al. | |
| 6,173,466 | B1 | | 1/2001 | Chen | |
| 6,220,074 | B1 | | 4/2001 | Montminy et al. | |
| 6,247,230 | B1 | | 6/2001 | Hart et al. | |
| 6,483,027 | B1 | * | 11/2002 | Howard et al. | 174/496 |
| 6,591,487 | B2 | * | 7/2003 | Chang | 29/751 |
| 6,594,888 | B2 | * | 7/2003 | Chang | 29/751 |
| 6,704,992 | B2 | | 3/2004 | Minor | |
| 6,807,728 | B2 | | 10/2004 | Griffin et al. | |
| 6,872,090 | B2 | * | 3/2005 | De Dios Martin | 439/417 |
| 6,948,234 | B1 | * | 9/2005 | Steiner | 29/751 |
| 6,981,313 | B2 | * | 1/2006 | Olejniczak et al. | 29/748 |
| 7,096,573 | B2 | * | 8/2006 | Holliday | 29/751 |
| 7,103,968 | B2 | * | 9/2006 | Karrasch | 29/758 |
| 7,120,997 | B2 | * | 10/2006 | Islam et al. | 29/751 |
| 2001/0007202 | A1 | | 7/2001 | Frenken | |
| 2004/0244190 | A1 | * | 12/2004 | Karrasch | 29/764 |
| 2005/0000266 | A1 | | 1/2005 | Hetland et al. | |
| 2005/0223548 | A1 | * | 10/2005 | Chen | 29/747 |
| 2005/0251991 | A1 | | 11/2005 | Alexander et al. | |
| 2007/0130757 | A1 | * | 6/2007 | Montena | 29/747 |
| 2007/0130758 | A1 | * | 6/2007 | Montena | 29/747 |

FOREIGN PATENT DOCUMENTS

| | | | |
|---|---|---|---|
| EP | 0476358 | A2 | 3/1992 |
| EP | 1403982 | A1 | 3/2004 |

* cited by examiner

TOOL FOR CONNECTORS ASSEMBLY

CROSS-REFERENCE TO RELATED APPLICATIONS

This application claims priority to U.S. Provisional Application No. 60/671,143, filed Apr. 14, 2005, and U.S. Provisional Application No. 60/756,014, filed Jan. 4, 2006, the entire contents of which are hereby incorporated by reference.

FIELD OF THE INVENTION

This invention relates in general to a multi-functional termination tool configured to provide two different electrical connector assembly operations using the same trigger mechanism. In particular, one side of the tool is used to simultaneously cut multiple electrical connector wires while another side is used to terminate end cap and housing sections of an electrical connector using the same trigger mechanism.

BACKGROUND

Many different designs of field installable modular connectors have been proposed. The desirable characteristics of field installable connectors include minimal size, ease of assembly, and reliable termination of the connector to communication wires. Modular connectors typically include a plurality of interlocking parts, including a housing that defines a standard connector jack and a contact carrier that carries and positions a plurality of insulation displacement contacts for termination to a plurality of individual wires. A wire positioning fixture positions the individual wires with each respective insulation displacement contact. The wire positioning fixture is typically secured to the housing by peripheral latching structural features that cooperate with structural features formed on the housing.

In preparing the connector for termination, the excess portions of the individual wires positioned in the wire positioning fixture are severed before the wire positioning fixture is secured to the contact carrier. It is desirable to align the wire positioning fixture with a cutting tool to ensure the wires are uniformly and simultaneously cut by the cutting tool. If the wire positioning fixture is not properly aligned, the wires can deflect along the wire positioning fixture instead of being severed or only a portion of the wire is severed thereby requiring the uncut wires to be individually severed by a wire cutter hand tool.

SUMMARY

In accordance with an aspect of the invention, a multi-use tool for assembly of electrical connectors includes a main tool body having an electrical connector assembly holder provided on the main tool body. The holder includes first and second cavities, each cavity being sized and shaped to removably retain an electrical connector end cap having two or more wires mounted thereon. The first cavity includes spaced anvils extending on two sides of the cavity facing excess wire lengths extending from the end cap. The second cavity is sized and shaped to receive the electrical connector end cap and a jack housing. A cutting ram is opposed to the first cavity and includes two cutting blades. The cutting ram is movably mounted to the main tool body between a disengaged position away from the first cavity and an engaged position in which the two cutting blades engage the spaced anvils and trim and sever the excess wire lengths extending beyond the end cap. A termination ram is opposed to the second cavity and includes a termination surface opposed to the second cavity. The termination ram is movably mounted to the main tool body between a disengaged position away from the second cavity and an engaged termination position in which the jack housing is urged into engagement with the end cap. A trigger mechanism is operably connected to both the cutting ram and the termination ram to move the cutting ram and the termination ram to the engaged positions when the trigger is actuated.

In accordance with various aspects of the invention, the tool may be hand-held including a pistol-grip type handle and a squeezable trigger.

In accordance with additional aspects, a wire retainer may be provided on the cutting ram of the tool to retain excess wire ends during and after severing.

In accordance with additional aspects, the tool may accommodate different connectors or connector lengths by provision of differently configured termination ram surfaces. This may be achieved through one or more removable insert or by rotation of the termination ram to expose a different termination surface to the connector.

BRIEF DESCRIPTION OF THE DRAWINGS

The invention will be described with reference to the following drawings, wherein.

DETAILED DESCRIPTION OF EMBODIMENTS

Figure 1:
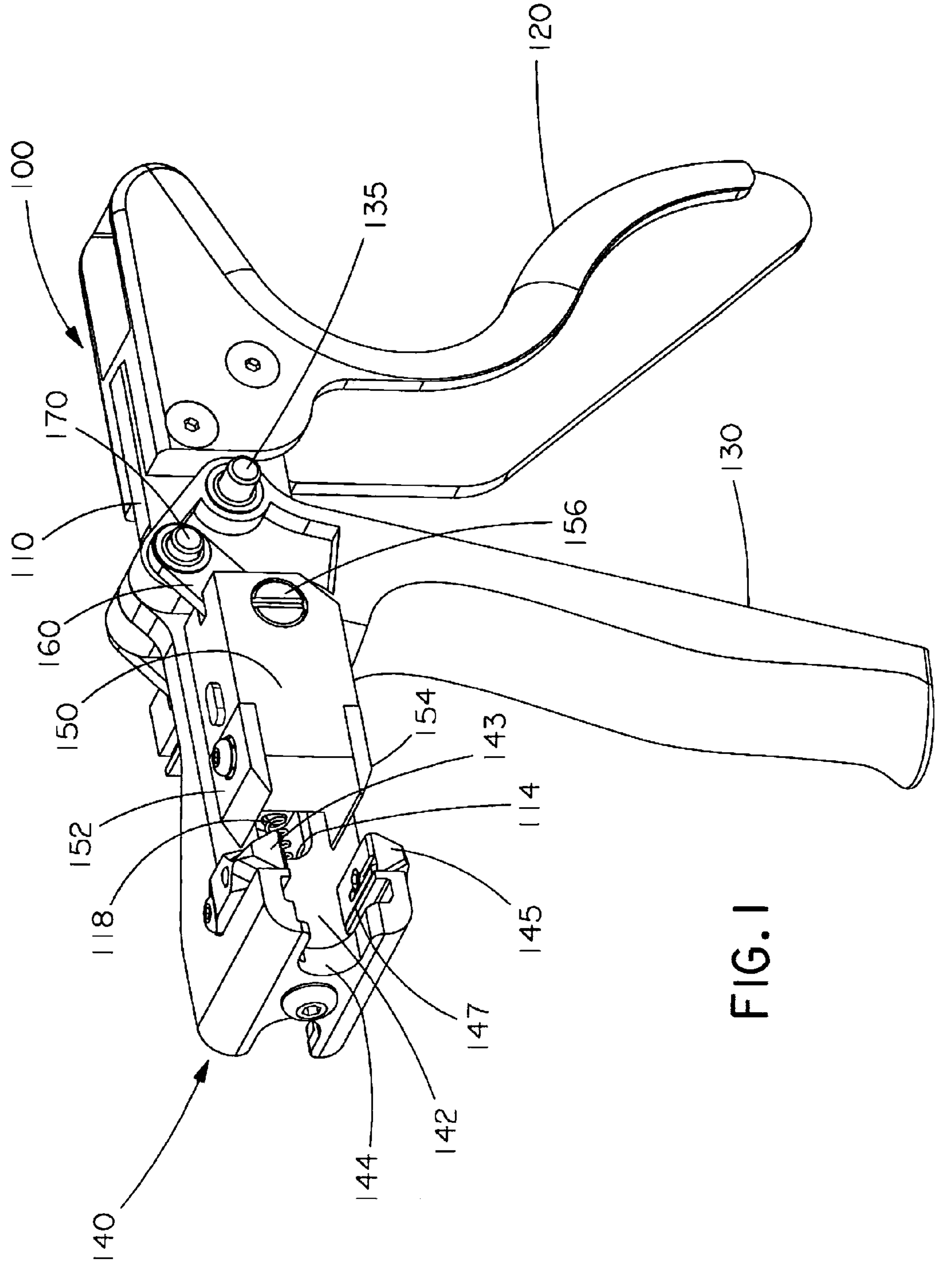
FIG. 1 is a perspective view of an exemplary termination tool showing a cutting side of the tool.

A first embodiment of a multi-functional termination tool 100 will be described with respect to FIGS. 1-8. Termination tool 100 is preferably a hand-held device having a main body 110, a pistol-grip type handle 120, and an actuation mechanism 130 in the form of a squeeze trigger configured to be squeezed by fingers of a user gripping the handle. A front nose portion of main body 110 includes an electrical connector assembly holder 140 that mounts an end cap of an electrical connector in one of two separate positions, namely a cutting position and a terminating position. In a preferred configuration, the nose portion includes symmetrical cavities 142, 146 provided on opposite sides of main body 110. Placing the end cap into the cavity on one side of the tool achieves one function while placing the end cap into the cavity on the other side of the tool achieves a different function.

Figure 3:
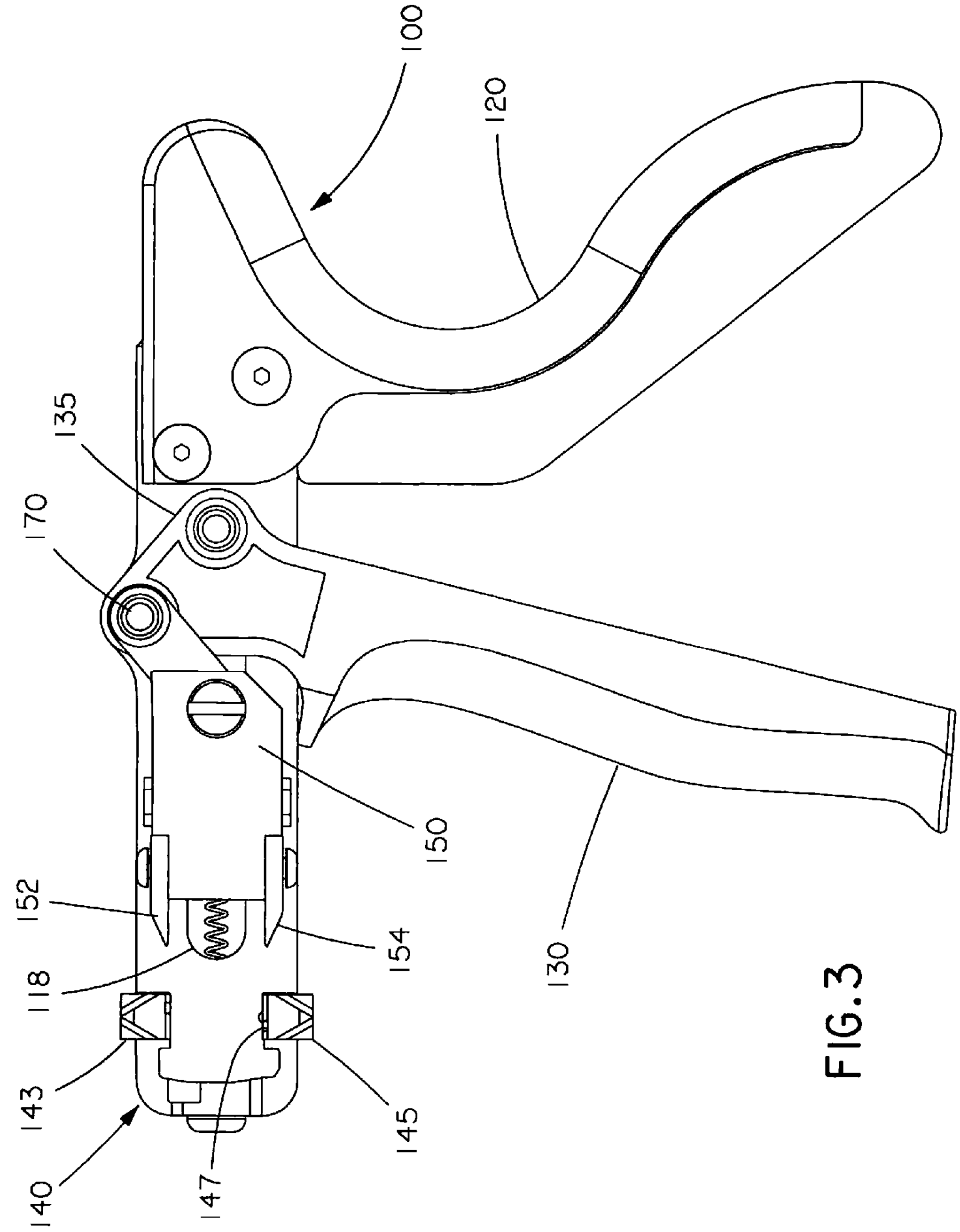
FIG. 3 is a side view of FIG. 1 showing the cutting side of the tool.

FIGS. 1 and 3 show a cutting side of tool 100, including first connector receiving cavity 142 suitably sized and shaped to receive and support an end cap of an electrical connector having a plurality of wires in need of trimming, such as for example, an RJ45 connector having eight wires. A first cable receiving slot 144 on the front of holder 140 receives an electrical cable of the electrical connector. A rear surface of cavity 142 includes first and second spaced anvils 143, 145 formed of a hard material, such as metal. One or more surfaces 147 of anvils 143, 145 facing the connector may include a spring ball plunger or other mechanism to assist in retention of the end cap within cavity 142.

A movable cutting ram 150 is opposed to first connector receiving cavity 142 and anvils 143, 145. Cutting ram 150 includes spaced first and second cutter blades 152, 154 opposed to first and second anvils 143, 145. Cutting ram 150 is linearly positionable between disengaged and engaged positions by actuation of trigger 130 through a translation mechanism.

In the illustrated example, trigger 130 is pivotally connected to main body 110 about fixed pivot pin 135 between a rest position and an actuated position. As an operator grips handle 120 and squeezes trigger 130, cutting ram 150 is linearly pushed through a suitable linkage assembly between the disengaged and engaged positions. In the example shown, a first end of toggle linkage 160 is connected to trigger 130 through a second pivot pin 170 offset from pivot pin 135. An opposite end of toggle linkage 160 is connected to a guide bolt 156 of a translation mechanism that constrains cutting ram 150 for linear movement. The translation mechanism may include an elongated guide slot 114 in main body 110 that guides bolt 156 and cutting ram 150 between positions. The bolt 156 is biased by spring 118. Rotation of trigger 130 causes toggle linkage 160 to urge the cutting ram 150 guided by guide slot 114 to its engaged position. Biased spring 118 then urges cutting ram 150 back to the disengaged position once the trigger 130 is released.

Figure 2:
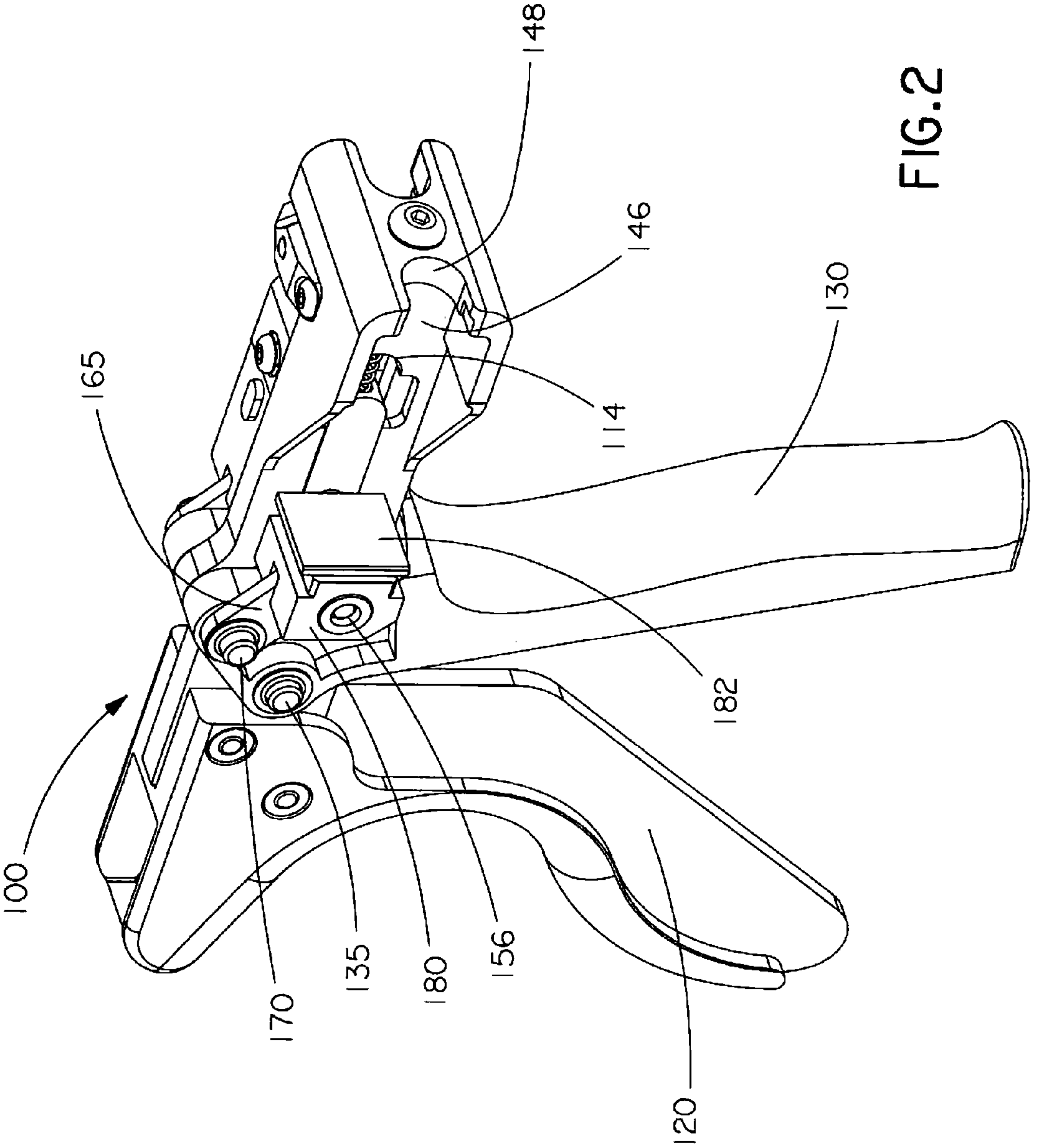
FIG. 2 is a perspective view of the termination tool of FIG. 1 showing a termination side of the tool.
Figure 4:
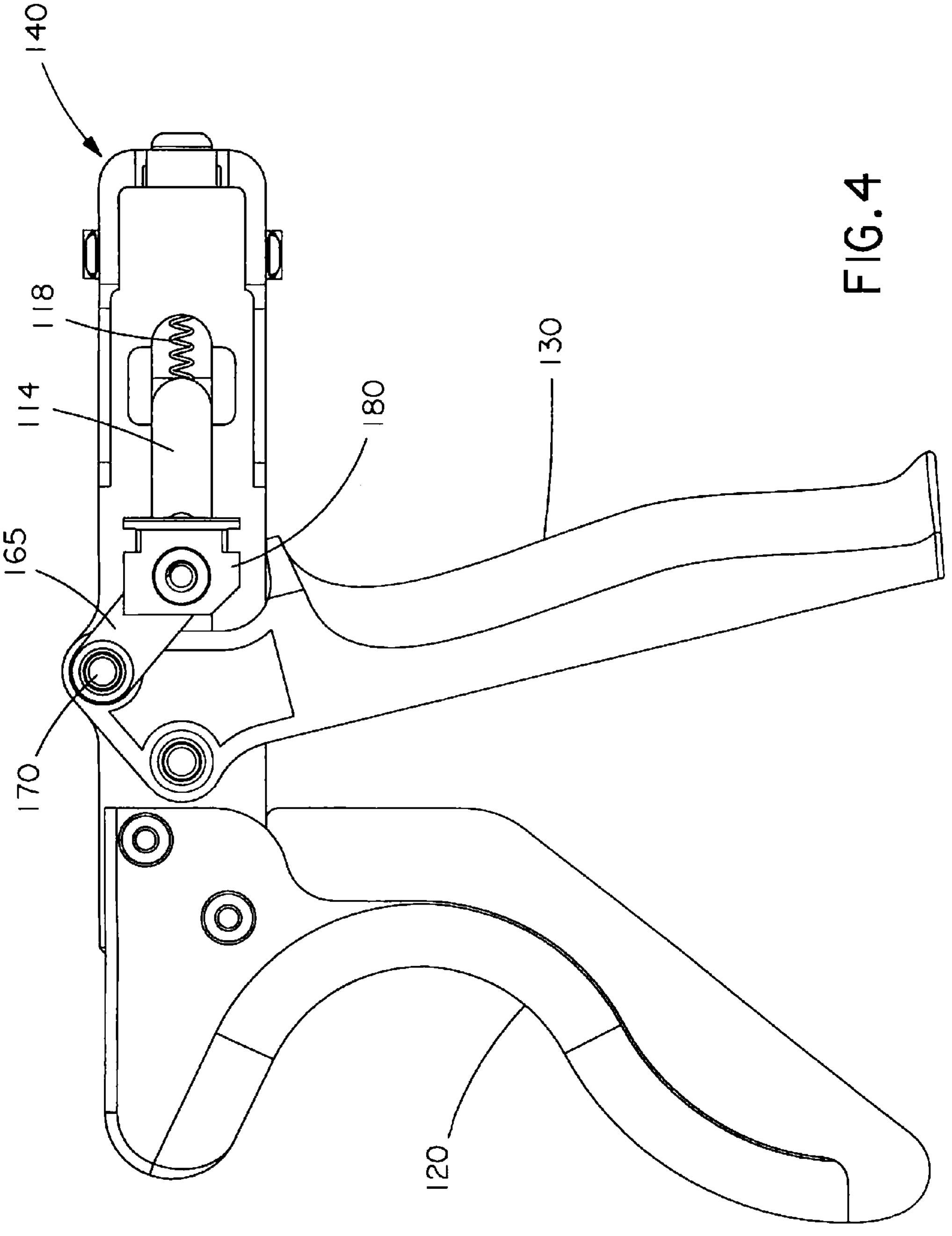
FIG. 4 is a side view of FIG. 2 showing the termination side of the tool.

FIGS. 2 and 4 show a termination side of tool 100, including a second connector receiving cavity 146 suitably sized and shaped to receive and support the end cap of an electrical connector, such as for example, a RJ45 connector, and a jack housing to be connected to the end cap. A second cable receiving slot 148 receives an electrical cable of the electrical connector.

A movable termination ram 180 is opposed to second connector receiving cavity 146 and positionable between disengaged and termination positions by actuation of trigger 130. Termination ram 180 includes at least one connector receiving termination surface 182 that is opposed to the second connector receiving cavity 146.

Rotation of trigger 130 to the actuated position by squeezing of trigger 130 causes movement of termination ram 180 through a suitable linkage assembly to the engaged position. In the example shown, a first end of toggle linkage 165 is connected to trigger 130 through offset second pivot pin 170. An opposite end of toggle linkage 165 is connected to bolt 156, which is connected to termination ram 180. Termination ram 180 is guided for linear movement by bolt 156 traveling within guide slot 114. Rotation of trigger 130 causes toggle linkage 165 to urge the termination ram 180 to its engaged position. Biased spring 118 urges the termination ram 180 back to the disengaged position once the trigger 130 is released.

Figure 5:
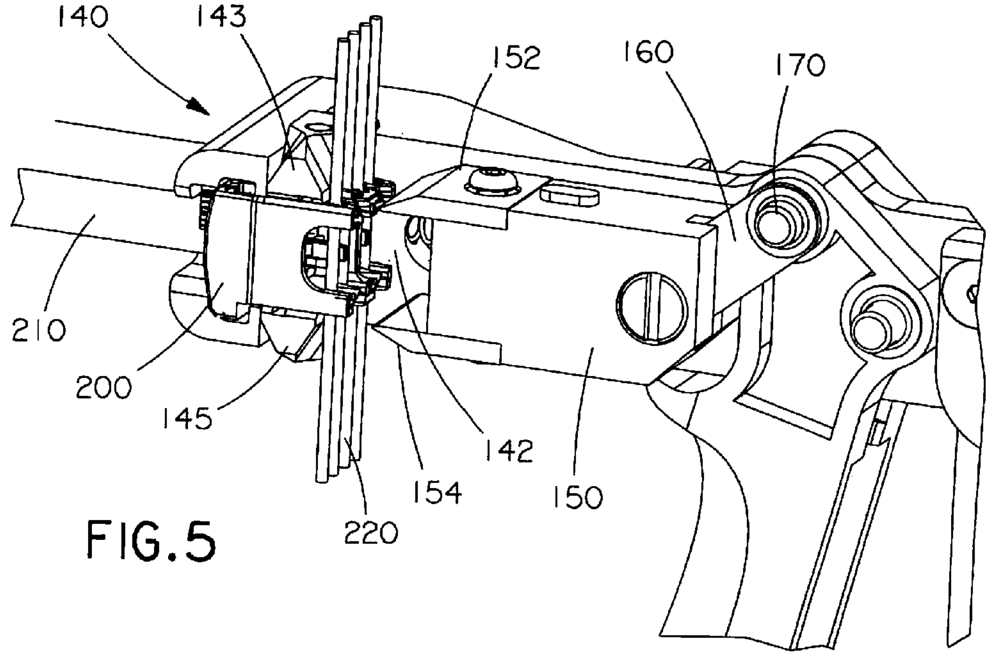
FIG. 5 is a partial view of FIG. 3 showing a cutting ram in an open position.

Specific details of an exemplary cutting operation will be described with respect to FIGS. 5-6. In the position shown in FIG. 5, a prepared end cap 200 is inserted into cavity 142 on the left side of the tool 100 between anvils 143, 145. Prepared end cap 200 includes a cable 210 and a plurality of individual wires 220 separated and positioned into respective insulation displacement contact slots in end cap 200 with excess wire lengths extending from end cap 200. End cap 200 is retained within the cavity by the spring ball plunger 147 with the wires 220 extending across anvils 143, 145 as shown.

Figure 6:
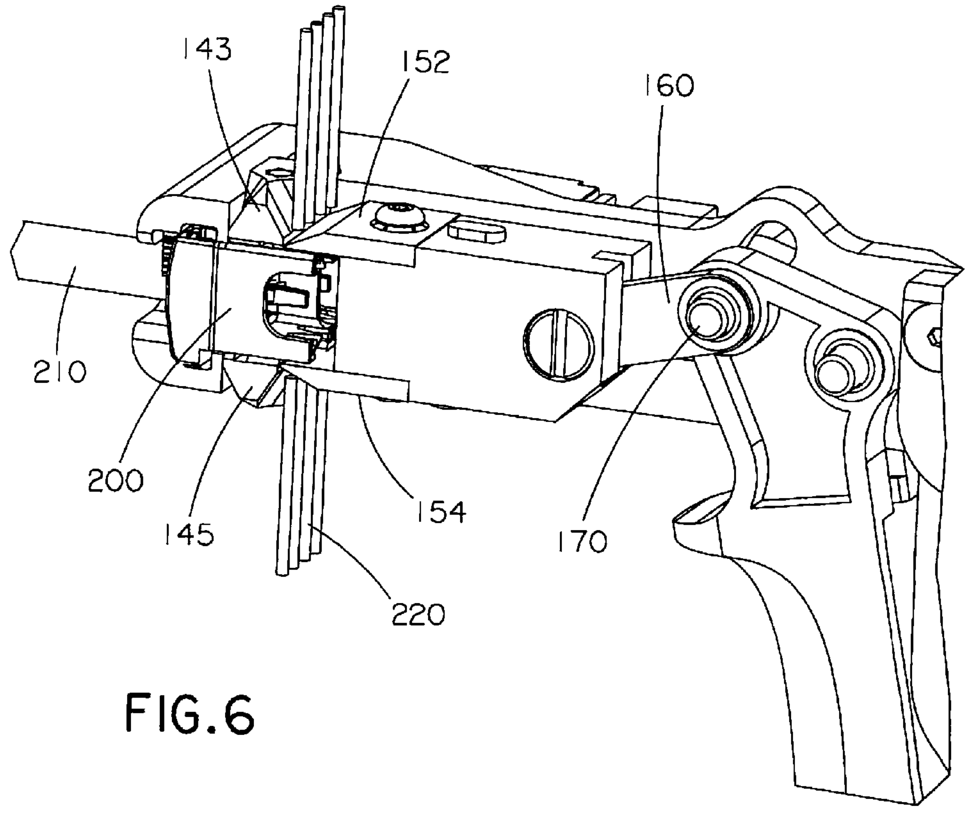
FIG. 6 is a partial view of FIG. 3 showing the cutting ram in a closed cutting position.

Upon actuation of trigger 130, cutting ram 150 is urged toward the anvils 143, 145 by toggle link 160 to the position shown in FIG. 6. As blades 152, 154 continue towards anvils 143, 145, they sever the excess wire ends upon contact with anvils 143, 145. Upon trimming of all of the wires, trigger 130 is released, causing retraction of cutting ram 150. In this disengaged position, trimmed end cap 200 can be removed from tool 100 and positioned in the other cavity 146 to complete a termination operation.

Figure 7:
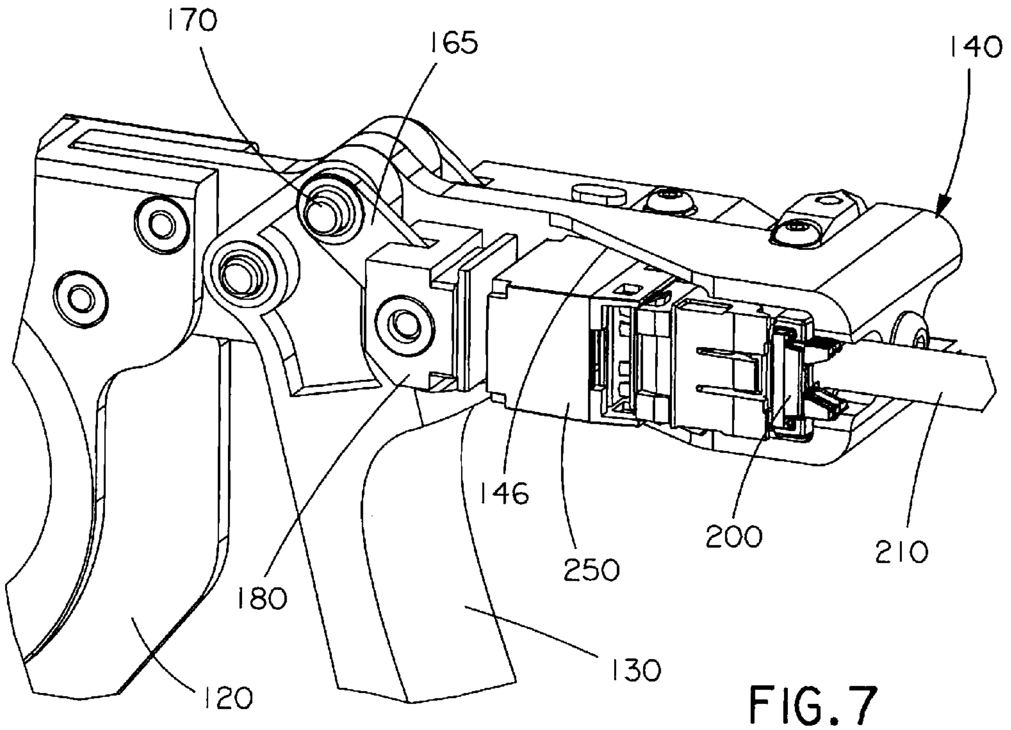
FIG. 7 is a partial view of FIG. 4 showing a termination ram in an open position.
Figure 8:
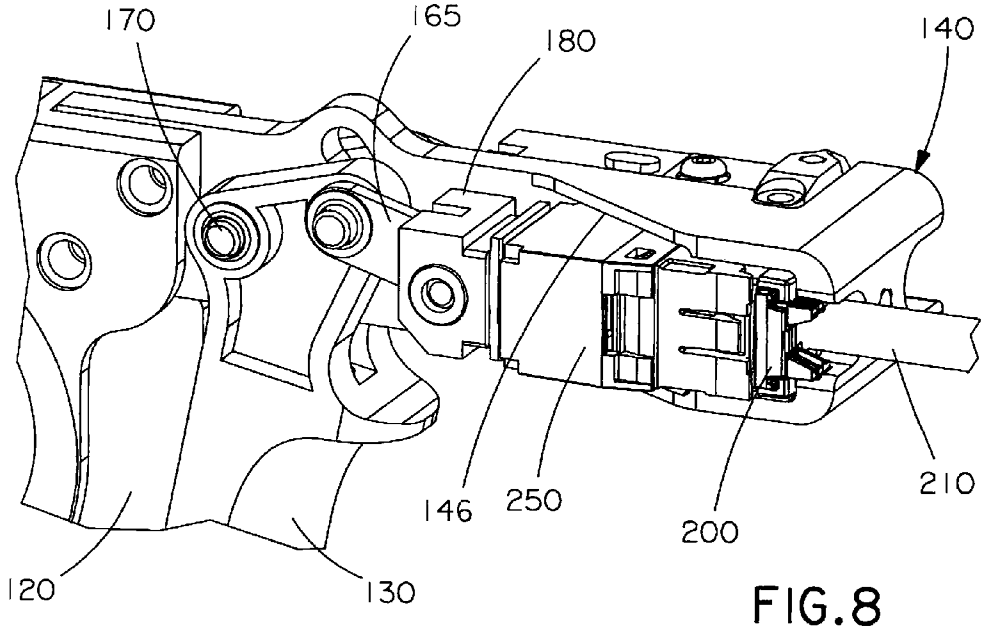
FIG. 8 is a partial view of FIG. 4 showing the termination ram in a closed termination position.
Figure 9:
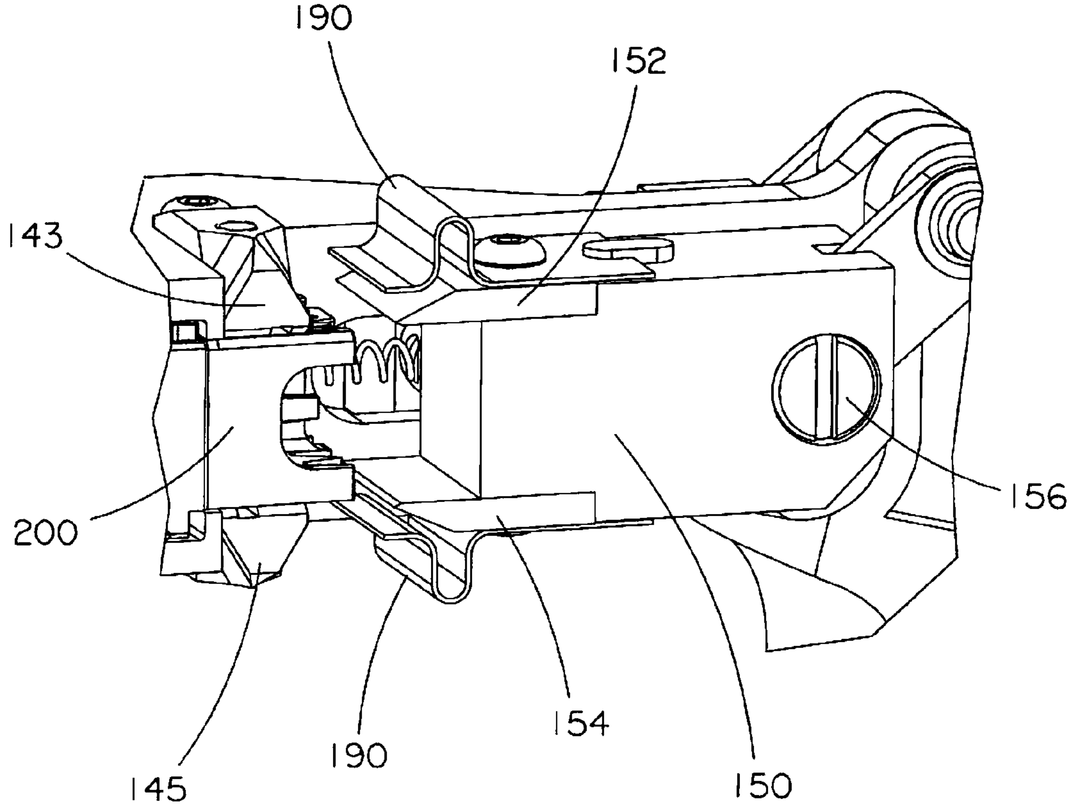
FIG. 9 is a partial perspective view of FIG. 3 showing the cutting ram with an optional pair of wire retainers.

Specific details of an exemplary termination operation will be described with respect to FIGS. 7-8. In the position of FIG. 7, a jack housing 250 is placed over end cap 200 and this assembly is placed into the second cavity 146. As trigger 130 is depressed, termination ram 180 is urged by toggle linkage 165 towards cavity 146 to force jack housing 250 onto end cap 200 to terminate the connector assembly. After termination, trigger 130 is released and termination ram 180 is retracted, allowing removal of the terminated connector assembly.

Thus, one multi-functional tool 100 can be used to achieve two different electrical connector assembly operations using the same trigger actuation mechanism, but different sides of the tool. Although illustrated to connect a particular electrical connector assembly, the various cavities and ram surfaces can be modified to achieve connection of different electrical connectors.

An alternative embodiment will be described with reference to FIGS. 9-12. This embodiment is similar to the previous embodiment and like elements have like numerals. The main difference is the addition of a wire-retaining feature. In the illustrated embodiment, wire retainers 190 are affixed to cutting ram 150 for movement therewith by suitable connection methods, such as by screws, rivets, bonding, adhesive or the like. A preferred embodiment uses resilient wire retainers 190 that apply a biasing force to the wires 220 during and after cutting. This may be achieved by using a bent piece of spring steel, or a spring-loaded wire retainer assembly.

Figure 10:
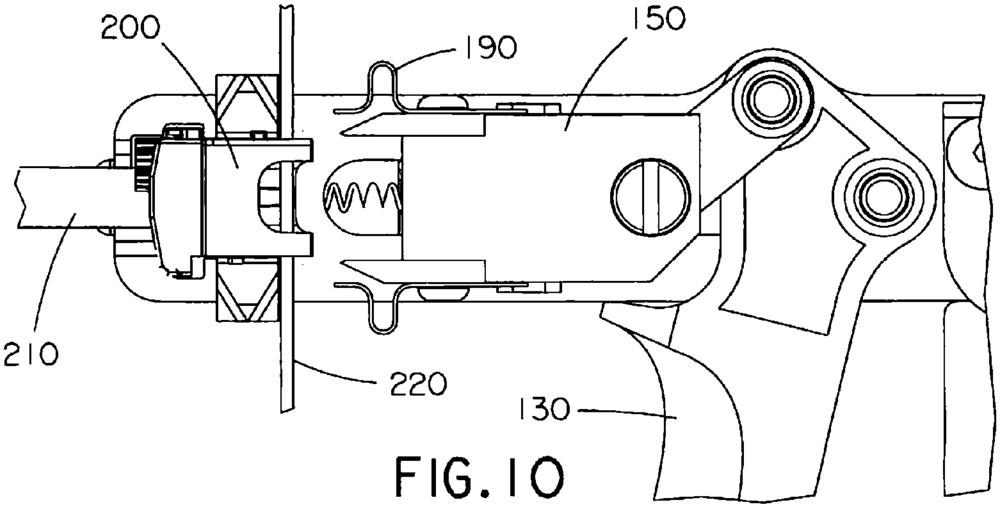
FIGS. 10-12 are partial side views of the embodiment of FIG. 9 in an open position, a closed termination position, and a subsequent open position, respectively.
Figure 11:
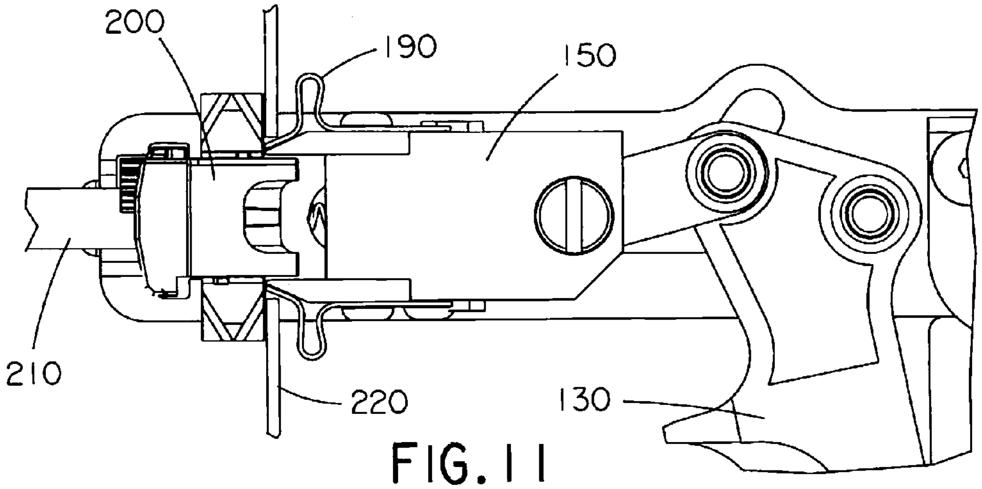

Upon actuation of trigger 130, cutting ram 150 is urged toward end cap 200 from the disengaged position shown in FIG. 10 to the engaged position shown in FIG. 11. Prior to contact with the cutter blades 152, 154, wires 220 are contacted by wire retainers 190 and compressed against anvils 143, 145. Upon further travel of the cutting ram to the full engaged position, the wire retainers 190 are resiliently deflected, allowing blades 152, 154 to pierce and sever the wires 220 through contact with anvils 143, 145, while retaining pressure on the severed wire ends.

Figure 12:
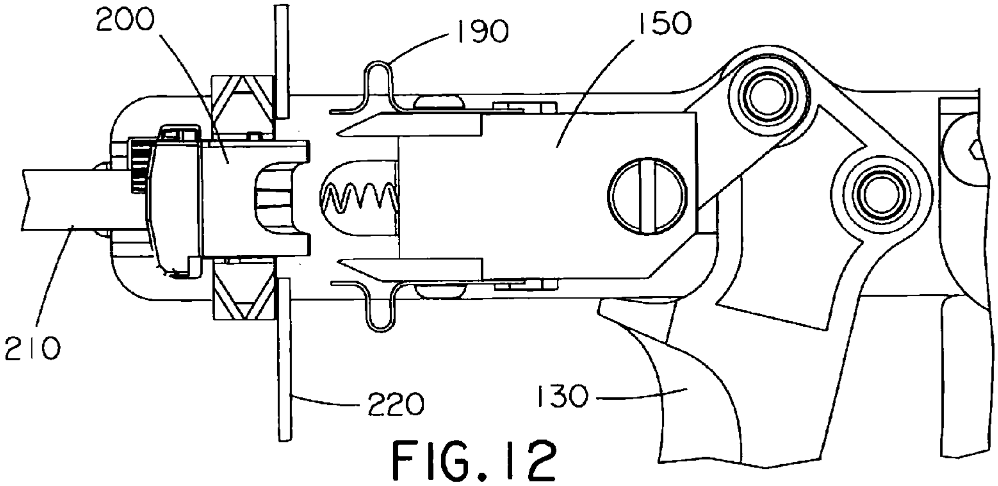
Figure 13:
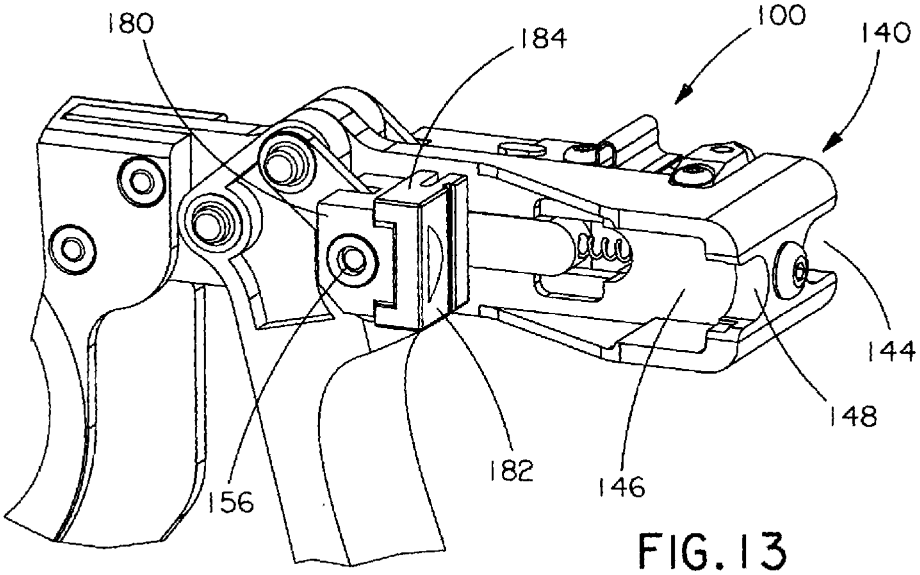
FIG. 13 is a partial perspective view of FIG. 4 showing an optional termination ram insert that can accommodate varying connector lengths.
Figure 14:
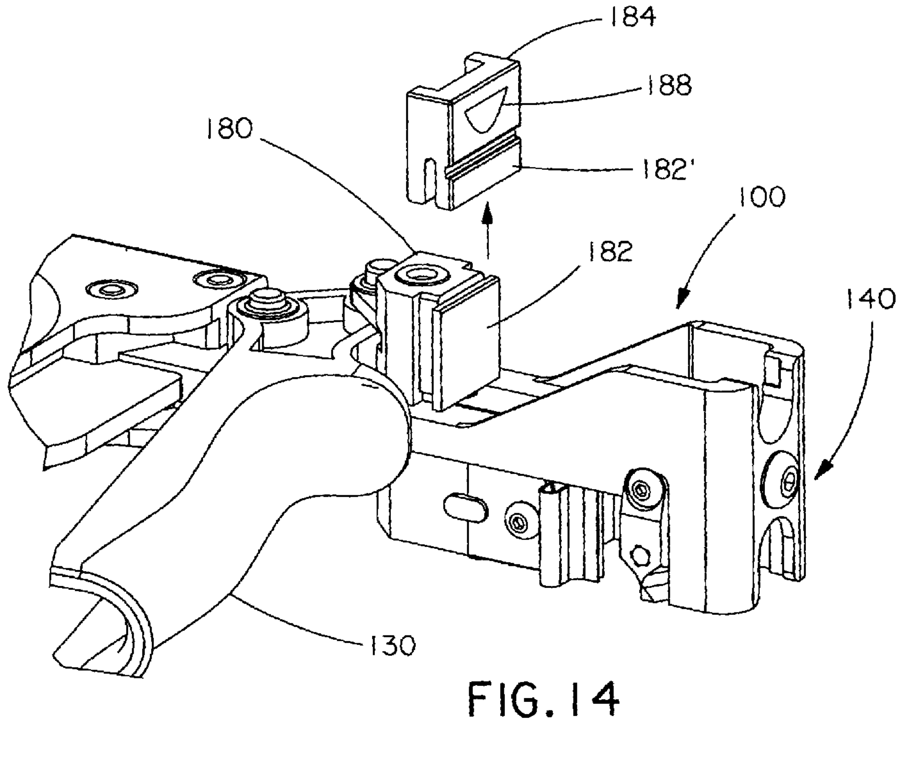
FIG. 14 is a partial perspective view of FIG. 13 showing removal of the termination ram insert.

At this time, the urging force applied to the now severed wires 220 by wire retainers 190 retains the wires against the anvils 143, 145 to prevent undesired dropping of the severed wire ends. Thus, by maintaining compression of trigger 130, an operator can hold the loose and severed wire ends while tool 100 is positioned over a waste receptacle or the like for proper disposal. Upon release of trigger 130, cutting ram 150 along with wire retainers 190 are retracted to the disengaged position as shown in FIG. 12, allowing the loose wires ends to fall from the tool. This disengaged position also allows for removal of the end cap from the tool.

Figure 15:
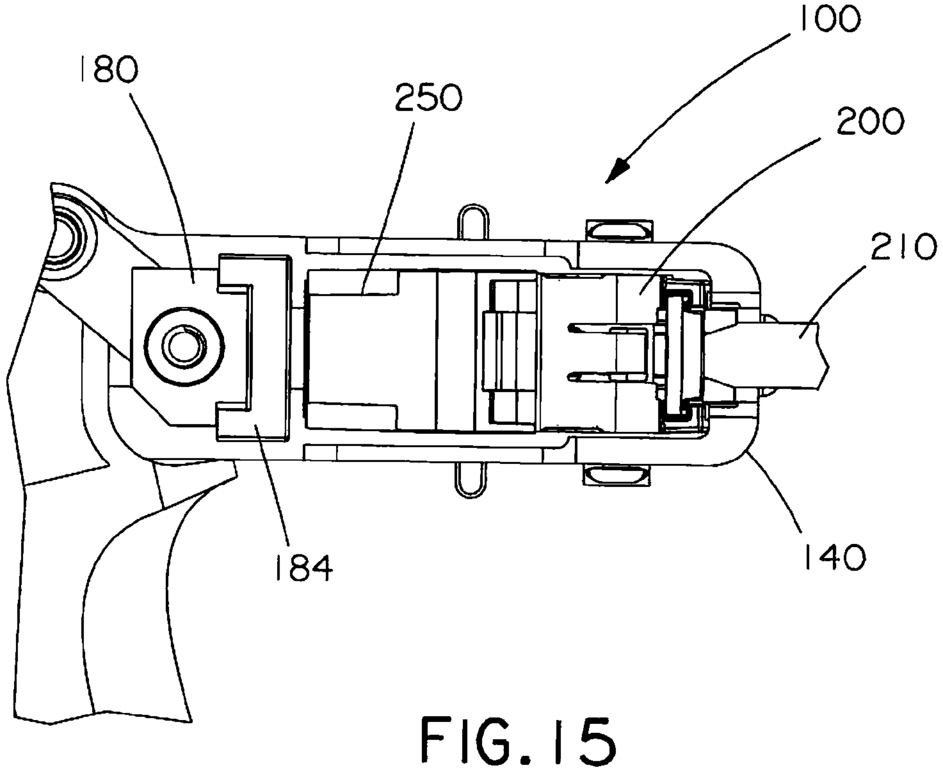
FIG. 15 is a partial side view of FIG. 13 showing the termination ram in a closed position to terminate a first connector type.
Figure 16:
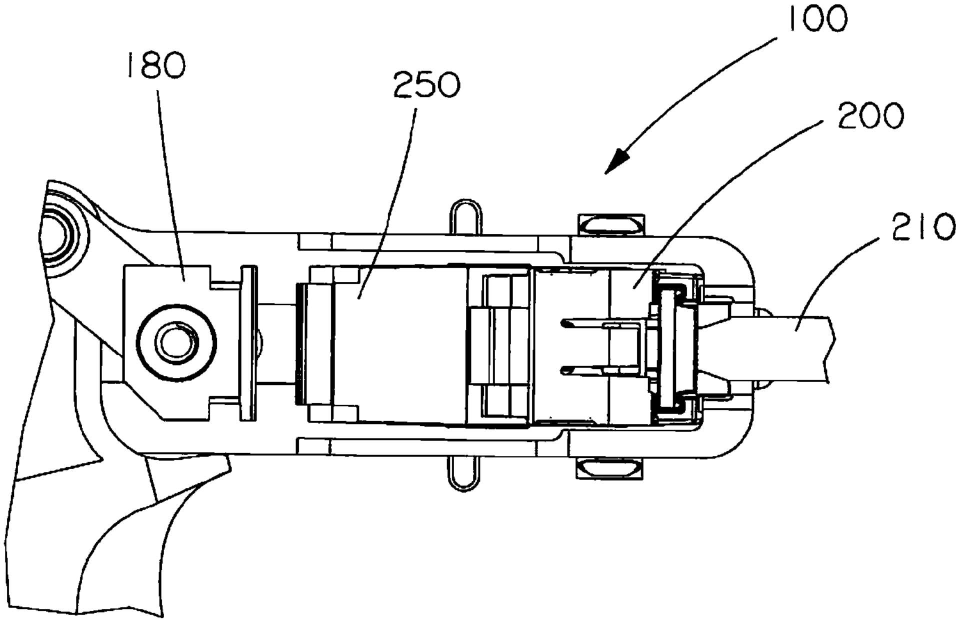
FIG. 16 is a partial side view of FIG. 13 showing the termination ram insert removed and the termination ram in a closed position to terminate a second connector type.

To accommodate different connectors or connector lengths, another embodiment of tool 100 is shown in FIGS. 13-16 that includes a termination ram insert 184 mountable on termination ram 180 to provide different termination surfaces 182, 182'. One or more different ram inserts 184 can be releasably connected to ram 180 by suitable attachment mechanisms, such as the dovetail arrangement shown or by screws, pins, snaps, fasteners, etc. In the embodiment shown, removal of insert 184 can be achieved by placing a finger into a recessed finger-pull area 188 shown in FIG. 14 and pulling upwards. Tool 100 with termination ram 180 and insert 184 can be used to terminate a standard connector housing as shown in FIG. 15 or termination ram 180 can be used without insert 184 to terminate a shuttered connector housing as shown in FIG. 16.

Figure 17:
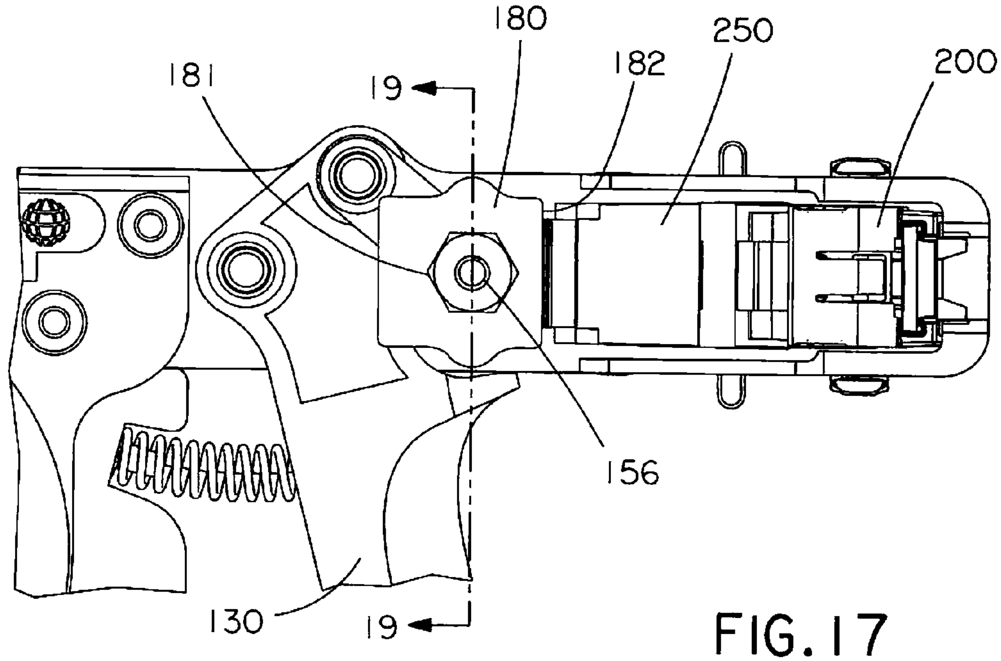
FIG. 17 is a partial side view of FIG. 4 showing a modified termination ram in a first position.
Figure 18:
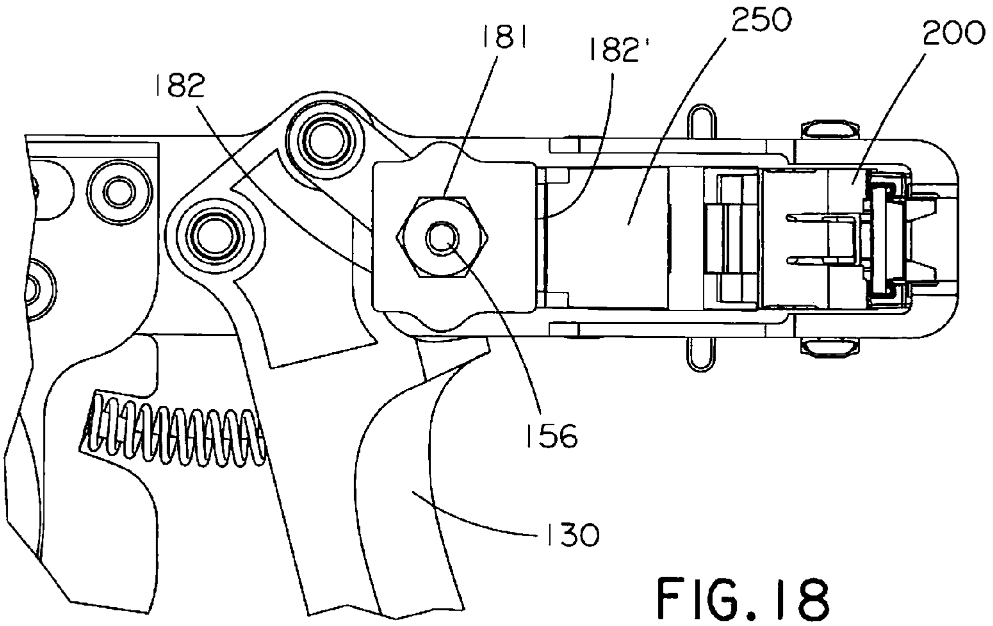
FIG. 18 is a partial side view of FIG. 17 showing the modified termination ram in a second rotated position.
Figure 19:
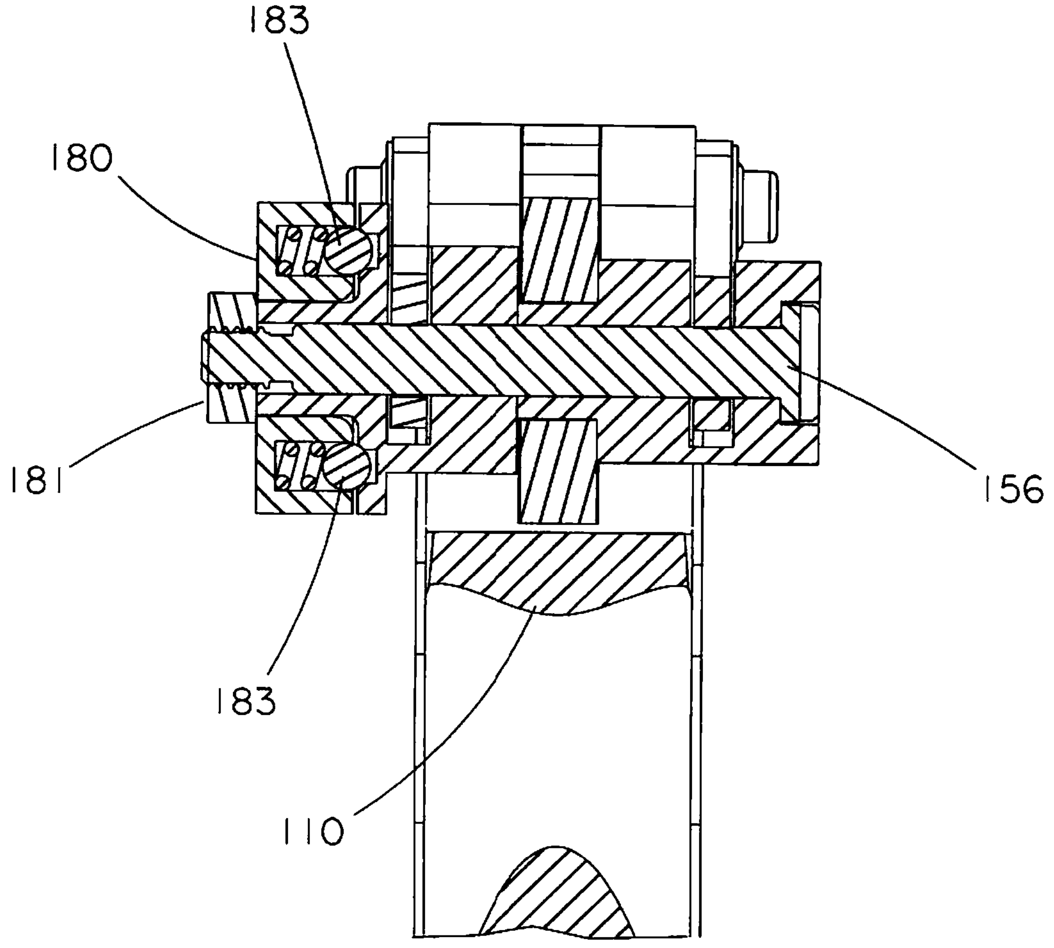
FIG. 19 is a cross-sectional view of the tool and modified termination ram taken along line 19-19 of FIG. 17.

An alternative embodiment that achieves termination of different types of connectors or connector lengths is shown in FIGS. 17-19. In this embodiment, termination ram 180 is rotatable to position different termination surfaces 182, 182' in opposition to cavity 146. In FIG. 17, termination ram 180 is rotated to provide surface 182 in contact with a shuttered connector housing. In FIG. 18, termination ram 180 is rotated to provide surface 182' in contact with a standard connector housing. Alternatively, a rotatable termination adapter may be mounted to a typical termination ram to provide various surfaces to contact the connector housing for termination.

Termination surface 182, 182' of termination ram 180 can be positioned by a suitable structure. FIG. 19 shows one example, in which bolt 156 is provided through main body 110 of the tool and termination ram 180 is threadedly retained against body 110 by a nut 181. Spring-biased ball bearings 183 may be provided to allow smooth rotation of termination ram 180 between various positions. Various notches or detents may be provided to retain termination ram 180 in predetermined positions. Thus, adjustment can be achieved through loosening of nut 181 and rotation of ram 180, or by sufficient pressure applied to ram 180 to overcome the spring force on bearings 183 to allow rotation of the ram.

The disclosed invention provides a termination tool that cuts connector wires, as well as terminates connector halves. It should be noted that the above-described and illustrated embodiments of the invention are not an exhaustive list of the forms such a tool in accordance with the invention might take; rather, they serve as exemplary and illustrative of embodiments of the invention as presently understood. Many other forms of the invention are believed to exist. For example, although shown with a preferable pistol-grip type handle 120, tool 100 may take other hand-held forms or may be in bench mounted form without a handle.

The invention claimed is:

1. A multi-use tool for assembly of electrical connectors, comprising:

a main tool body;

an electrical connector assembly holder provided on the main tool body, the holder including first and second cavities, wherein the first cavity includes spaced anvils extending on each side of the first cavity;

a cutting ram opposed to the first cavity, the cutting ram including two cutting blades, the cutting ram being movably mounted to the main tool body between a disengaged position away from the first cavity and an engaged position, wherein the cutting blades of the cutting ram engage the spaced anvils while in the engaged position thereby severing excess wire lengths extending beyond an electrical connector end cap removably installed in the first cavity;

a termination ram opposed to the second cavity, the termination ram including a termination surface, the termination ram being movably mounted to the main tool body between a disengaged position away from the second cavity and an engaged termination position; and a trigger mechanism operably connected to both the cutting ram and the termination ram to move the cutting ram and the termination ram to the engaged positions when the trigger mechanism is actuated.

2. The multi-use tool according to claim 1, wherein the second cavity being sized and shaped to receive an electrical connector end cap and a jack housing whereby the termination ram urges the jack housing into engagement with the electrical connector end cap.

3. A multi-use tool for assembly of electrical connectors, comprising:

a main tool body;

an electrical connector assembly holder provided on the main tool body, the holder including first and second cavities, the first cavity being sized and shaped to removably retain an electrical connector end cap having two or more wires mounted thereon, the first cavity including spaced anvils extending on two sides of the first cavity facing excess wire lengths extending from the end cap, the second cavity being sized and shaped to receive the electrical connector end cap and a jack housing;

a cutting ram opposed to the first cavity, the cutting ram including two cutting blades, the cutting ram being movably mounted to the main tool body between a disengaged position away from the first cavity and an engaged position in which the two cutting blades engage the spaced anvils and trim and sever the excess wire lengths extending beyond the end cap;

a termination ram opposed to the second cavity, the termination ram including a termination surface opposed to the second cavity and being movably mounted to the main tool body between a disengaged position away from the second cavity and an engaged termination position in which the jack housing is urged into engagement with the end cap; and a trigger mechanism operably connected to both the cutting ram and the termination ram to move the cutting ram and the termination ram to the engaged positions when the trigger mechanism is actuated.

4. The multi-use tool according to claim 3, wherein the tool is a hand-held tool having a handle.

5. The multi-use tool according to claim 4, wherein the handle is of a pistol-grip type and the trigger mechanism is configured to be squeezed by fingers of a user gripping the handle.

6. The multi-use tool according to claim 3, wherein the cutting ram and the termination ram are provided on opposite sides of the tool and linearly translate through a common translation mechanism.

7. The multi-use tool according to claim 6, wherein the translation mechanism includes an elongated guide slot in the main body, a guide bolt connecting the cutting ram and the termination ram through the elongated guide slot, and a linkage assembly operably connecting the guide bolt to the trigger mechanism.

8. The multi-use tool according to claim 7, wherein the trigger mechanism pivots about a fixed pivot pin mounted on the main tool body and the linkage assembly connects to a second pin on the trigger mechanism offset from the fixed pivot pin.

9. The multi-use tool according to claim 3, further comprising resilient wire retainers on the cutting ram oriented to contact the excess wire lengths prior to the two cutting blades, the wire retainers retaining severed wire ends until release of the trigger mechanism.

10. The multi-use tool according to claim 3, wherein the termination ram is adapted to termination of different electrical connectors by a changed termination surface location relative to the second cavity.

11. The multiuse tool according to claim 10, wherein a termination ram insert is releasably mounted on the termination ram to provide the changed termination surface location.

12. The multiuse tool according to claim 10, wherein the termination ram includes a periphery that defines multiple termination surfaces, rotation of the termination ram providing the changed termination surface location.

13. The multi-use tool according to claim 12, wherein a ball bearing is provided between the termination ram and the main tool body to allow rotation of the termination ram.

14. A hand-held multi-use tool for assembly of electrical connectors, comprising:

a main tool body having a pistol-grip type handle;

an electrical connector assembly holder provided on the main tool body, the holder including first and second cavities provided on opposite sides of the main tool body, the first cavity being sized and shaped to removably retain an electrical connector end cap having two or more wires mounted thereon, the first cavity including spaced anvils extending on two sides of the cavity facing excess wire lengths extending from the end cap, the second cavity being sized and shaped to receive the electrical connector end cap and a jack housing;

a linearly translatable cutting ram opposed to the first cavity, the cutting ram including two cutting blades, the cutting ram being linearly translated along the main tool body between a disengaged position away from the first cavity and an engaged position in which the two cutting blades engage the spaced anvils and trim and sever the excess wire lengths extending beyond the end cap;

a linearly translatable termination ram opposed to the second cavity, the termination ram including a termination surface opposed to the second cavity and being linearly translated along the main tool body between a disengaged position away from the second cavity and an engaged termination position in which the jack housing is urged into engagement with the end cap; and a squeeze trigger configured to be squeezed by fingers of a user gripping the handle, the squeeze trigger being operably connected to a common translating mechanism that linearly moves both the cutting ram and the termination ram to the engaged positions when the trigger is actuated.

15. The hand-held multi-use tool according to claim 14, wherein the cutting ram and the termination ram are provided on opposite sides of the tool.

16. The hand-held multi-use tool according to claim 15, wherein the translation mechanism includes an elongated guide slot in the main body, a guide bolt connecting the cutting ram and the termination ram through the elongated guide slot, and a linkage assembly operably connecting the guide bolt to the trigger.

17. The hand-held multi-use tool according to claim 16, wherein the trigger pivots about a fixed pivot pin mounted on the main tool body and the linkage assembly connects to a second pin on the trigger offset from the fixed pivot pin.

18. The hand-held multi-use tool according to claim 14, further comprising resilient wire retainers on the cutting ram oriented to contact the excess wire lengths prior to the two cutting blades, the wire retainers retaining severed wire ends until release of the trigger.

19. The hand-held multi-use tool according to claim 14, wherein the termination ram is adapted to termination of different electrical connectors by a changed termination surface location relative to the second cavity.

20. The hand-held multi-use tool according to claim 19, wherein a termination ram insert is releasably mounted on the termination ram to provide the changed termination surface location.

21. The hand-held multi-use tool according to claim 19, wherein the termination ram includes a periphery that defines multiple termination surfaces, rotation of the termination ram providing the changed termination surface location.

22. The hand-held multi-use tool according to claim 21, wherein a ball bearing is provided between the termination ram and the main tool body to allow rotation of the termination ram.

* * * * *

UNITED STATES PATENT AND TRADEMARK OFFICE

CERTIFICATE OF CORRECTION

PATENT NO. : 7,444,744 B2
APPLICATION NO. : 11/403273
DATED : November 4, 2008
INVENTOR(S) : Jack E. Caveney et al.

It is certified that error appears in the above-identified patent and that said Letters Patent is hereby corrected as shown below:

On the title page, item [54] and column 1 line 1:

which states the title as “Tool for Connectors Assembly”, should state the title as “Tool for Connector Assembly”.

Signed and Sealed this

Seventeenth Day of March, 2009

JOHN DOLL
*Acting Director of the United States Patent and Trademark Office*